Figure 1:
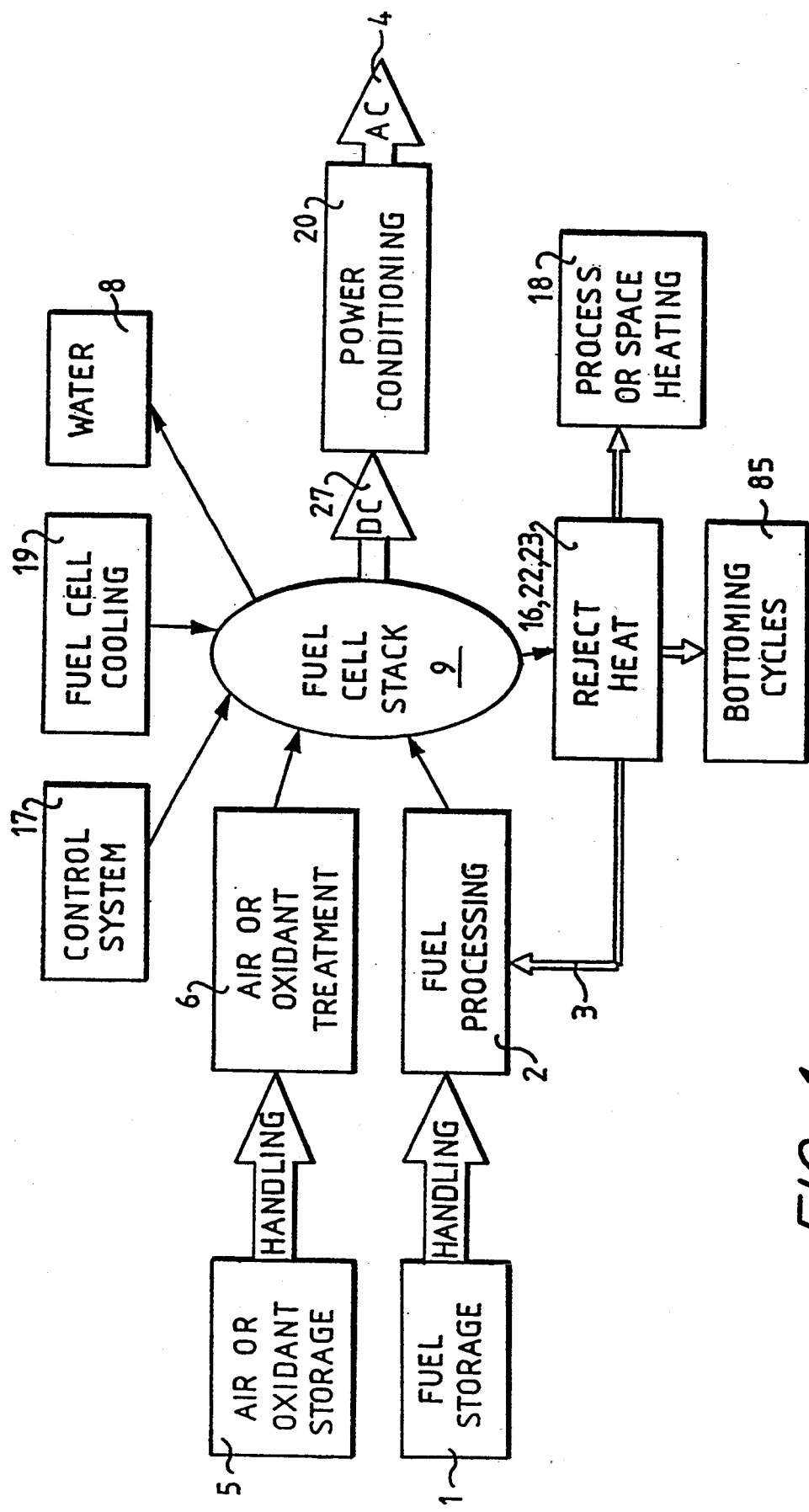

United States Patent [19]

Palmer et al.

[11] Patent Number: 5,401,589

[45] Date of Patent: Mar. 28, 1995

[54] APPLICATION OF FUEL CELLS TO POWER GENERATION SYSTEMS

[75] Inventors: Ian Palmer; Clive M. Seymour, both of Cumbria; Robert A. J. Dams, West Sussex, all of United Kingdom

[73] Assignees: Vickers Shipbuilding and Engineering Limited; CJBD Limited, both of United Kingdom

[21] Appl. No.: 64,120

[22] PCT Filed: Nov. 22, 1991

[86] PCT No.: PCT/GB91/02066

§ 371 Date: Jul. 23, 1993

§ 102(e) Date: Jul. 23, 1993

[87] PCT Pub. No.: WO92/10009

PCT Pub. Date: Jun. 11, 1992

[30] Foreign Application Priority Data

Nov. 23, 1990 [GB] United Kingdom ............... 9025538
Nov. 23, 1990 [GB] United Kingdom ............... 9025539

[51] Int. Cl.⁶ .............................................. H01M 8/04
[52] U.S. Cl. ...................................... 429/13; 429/17; 429/19; 429/20; 429/24
[58] Field of Search ................... 429/13, 17, 19, 24; 44/20

[56] References Cited

U.S. PATENT DOCUMENTS

| | | |
|---|---|---|
| 3,338,681 | 8/1967 | Kordesch . |
| 3,469,944 | 9/1969 | Bocard et al. . |
| 3,522,019 | 7/1970 | Buswell et al. . |
| 3,607,066 | 9/1971 | Basch et al. . |
| 4,349,613 | 9/1982 | Winsel .......................... 429/17 |
| 4,839,246 | 6/1989 | Takabayashi ................. 429/12 |
| 4,973,528 | 11/1990 | Sanderson ..................... 429/12 |
| 5,094,926 | 3/1992 | Kobayashi et al. ............ 429/20 |

FOREIGN PATENT DOCUMENTS

| | | |
|---|---|---|
| 1383782 | 10/1964 | France . |
| 1417757 | 12/1964 | France . |
| 1131171 | 10/1966 | United Kingdom . |
| 2132108 | 12/1982 | United Kingdom . |

OTHER PUBLICATIONS

Extended Abstracts. vol. 83, No. 2, 9 Oct. 1983, Washington, D.C. pp. 600–601; J. J. Early And All: "An Integrated Fuel Cell/Battery Power System For A Forklift Truck".

Proceedings of the 25th Intersoc. Energy Conversion Engineering Conference vol. 3, 12 Aug. 1990, Reno Nevada, pp. 308–313; C. V. Chi and All: "Development of a Fuel Cell Power Source for Bus".

Patent Abstracts of Japan. vol. 10, No. 104 (E-397) (2161) 19 Apr. 1986 & JP,A, 60 251 672 (Hitachi Seisakusho K.K.) 30 Nov. 1985.

Patent Abstracts of Japan. vol. 7, No. 276 (E-215) (1421) 9 Dec. 1983 & JP,A, 58 155 669 (Kansai Denriyoku K.K.) 16 Sep. 1983.

Patent Abstracts of Japan. vol. 14, No. 304 (C-734) (4247) 29 Jun. 1990 & JP,A, 02 102 101 (Fuji Electric Co., Ltd) 13 Apr. 1990.

Patent Abstracts of Japan. vol. 12, No. 230 (C-508) 29 Jun. 1988 & JP,A, 63 026 201 (Babcock Hitachi) 2 Feb. 1988.

Proc. Power Sources Symp. 30th 1982, pp. 12–14; J. A. Woerner and All: "Fuel Cells for Underwater Propulsion Applications".

*Primary Examiner*—Prince Willis, Jr.
*Assistant Examiner*—M. Nuzzolillo
*Attorney, Agent, or Firm*—Larson & Taylor

[57] ABSTRACT

The invention is drawn to an electrical power generation system and a method of electrical power generation. The system includes a supply of hydrogen-containing fuel and a reformer for obtaining hydrogen therefrom, a supply of oxygen and a material for producing an exothermic reaction. The system also includes a fuel cell and means for disposing of waste products arising from the fuel cell and other parts of the system, a control means and heat exchange means for regulating flow streams and balancing the heating and cooling requirements. The reformer comprises a reforming chamber, inlet and outlet for the fuel. Also the reformer includes a second chamber which surrounds the reforming chamber and a preheating chamber. Fins extend through a wall separating the reforming and surrounding chamber.

38 Claims, 8 Drawing Sheets

APPLICATION OF FUEL CELLS TO POWER GENERATION SYSTEMS

This invention relates to the application of fuel cells to power generation systems.

It is known that fuel cells can produce an electrical output when appropriate substances are supplied. Until recently, fuel cells have lacked the power density to be considered as primary sources of power for industrial applications. However recent developments have led to a new generation of fuel cell designs which possess attributes such as:

high efficiency
efficiency which is relatively independent of load
little or no pollution
high power density
low level of heat wastage
very low noise and vibration characteristics The above properties offer a very attractive combination and suggest possible applications in transport, every day and emergency power supply systems, electric power supplies for small pleasure boats, or at remote locations, etc. Fuel cells also offer a viable means of submarine propulsion, particularly when submerged, but also when surfaced, or snorting; in this regard, a fuel cell power generation system could be the primary source of power, e.g. for driving the electric propulsion motor, for the provision of power for hotel and other loads and for battery charging.

Unfortunately, there are drawbacks, such as:
possible difficulties of fuel storage
sensitivity to impurities
the need to develop supporting systems
still to be widely used in the market
high capital costs Though the above drawbacks are not insignificant, the benefits far outweigh them. For example, the thermal efficiency of even the most efficient power station is only about 30–35% in terms of electrical output, while for the solid polymer type of fuel cell, it is about 70%. There is thus a need to develop the support systems required to provide a viable, self-contained fuel cell power generation system.

According to a first aspect of the present invention, there is provided an electrical power generation system comprising:

a supply of a first substance;
a supply of a second substance;
a fuel cell capable of producing electrical power when fed with reactants.
apparatus to treat said first and second substances in such manners as to provide said reactants;
means to feed said reactants to said fuel cell so that electrical power is produced;
means to dispose of waste products arising from said fuel cell and other parts of the system;
a control means to regulate components of the system and to regulate flow streams of the system; and
heat exchange means to substantially balance the heating and cooling requirements within said system.

According to a second aspect of the present invention, there is provided a method of electrical power generation comprising the steps of:
providing first and second substances;
providing a fuel cell capable of producing electrical power when fed with reactants;
treating said first and second substances in such manners as to provide the reactants for the fuel cell;
feeding said reactants to said fuel cell so that electrical power is produced;
disposing of the waste products from the fuel cell and other parts of the power generation system;
regulating the operating parameters of the power generating system as a whole and of the individual components of the system and regulating the flow between the components; and
balancing the heating requirements of one or more parts of the system with the cooling requirements of one or more other parts of the system.

Preferably, the output energy of the fuel cell is conditioned to convert it into a more readily usable form as D.C. or A.C. power, e.g. 240 volts A.C.

By regulating the parameters of each relevant component of the system and by regulating the relevant flow streams of the system it is possible to ensure that the system functions reliably and at maximum efficiency over a wide range of operating conditions.

The matching of the heating and cooling requirements is achieved by the use of heat exchangers and by waste management. It may also include placing sources of heat and processes requiring heat in juxtaposition so that heat may be transferred via a separating wall, via heat pipes or other means of enhanced heat transfer. Sources of waste heat, which cannot be utilised in the system itself, can be used for space heating or perhaps for further electrical power generation, e.g. by discharging pressurised fluids via a turbogenerator, or to boil a working fluid (such as a refrigerant gas) which is discharged via a turbogenerator.

Waste management may be effected by disposing of the waste products arising from the fuel cell by catalytic oxidation of excess hydrogen or other combustible substances using excess air or oxygen and preferably extracting the waste heat from the combustion for use as process heating.

By balancing the heating and cooling requirements in this way it is possible to optimise the overall efficiency of the system and the level of net electrical power production.

In a particularly preferred embodiment, the first substance is a fuel for example a hydrogen-rich hydrocarbon or derivative thereof such as methane or methanol and the apparatus for treating said first substance is a fuel processor, preferably in the form of a combined reformer and heat exchanger such that heat is produced by the combustion of waste gases and/or other suitable fuel and transferred, preferably co-currently, to the fuel to be reformed in the reforming part of the combined reformer and heat exchanger. In this case, the second substance is an oxidant, e.g. oxygen preferably supplied in the form of air and the treatment apparatus includes a filter and possibly a humidifier. Alternatively the source of oxygen may be liquid oxygen or via chemical processing of a suitable precursor.

The reforming reaction produces hydrogen gas and preferably is conducted in a central cylindrical core of the reformer filled with pellets of catalyst while the combustion occurs in an annular combustion chamber surrounding the central core which constitutes a reforming chamber. Advantageously, means of enhancing the rate of heat transfer may be employed, e.g. fins may be provided on the common separating wall or heat pipes (though heat pipes are not preferred due to the risk of leakage). The application of a catalyst to the fins and the surface of the separating wall to enhance combustion in the combustion annulus is also preferred. Advantageously, a second annular chamber, outside the combustion chamber and sharing a common separating wall may be used to preheat the reactants prior to admission to the reforming chamber. Here again fins or other measures to enhance the heat transfer are preferably provided.

Preferably the catalyst used to reform the hydrogen-containing fuel is a mixture comprising compounds selected from the group comprising oxides of copper and zinc and other suitable metallic compounds, in their reduced, or partly reduced, form and in a form with a large surface area. Preferably, the mixture is applied to a suitable substrate.

A further preferred design includes hollow metal tubes passing through the reformer bed with the combustible gas mixture being fed through the pipes. Ideally, the outside of the tubes is provided with fins and the inside coated with a catalyst to promote catalytic combustion on the metal surface. In this design too, the incoming reactants may be preheated in a chamber adjacent to the reforming chamber.

A further preferred design feature provides unprotected electrical heating elements disposed in the reforming chamber. Although electrical heating by means of such elements constitutes a parasitic loss, the heat is provided directly to the reactant gas. Furthermore, the oxide covering on the elements can act as a catalyst. This design feature is particularly advantageous for the start-up of the system and where the throughput of the reformer is to be increased in a stepwise manner.

In a variation of this embodiment, the number, type and physical form of the measures used to enhance heat transfer are variable radially and along the axial length of the reforming and combustion chambers so that the quantity of heat being transferred to the reforming chamber is predetermined to give a specified temperature profile in said reforming chamber in both the axial and radial directions.

Advantageously the temperature in the reforming chamber falls from about 300° C. to 225° C. This can be achieved by passing the combustion gases co-currently with the reactants into and through a concentric reforming/combustion unit in which elements to enhance heat transfer, such as catalytically coated fins, are varied in both number and surface area along the axial length of the heat transfer zone. This temperature profile is preferred to maximise the production of hydrogen and minimise the formation of carbon monoxide. Similar measures can be taken with the heat transfer to the incoming gases in the preheating chamber. The method of finite element analysis is suitable for determining the ideal number and form of the heat transfer elements.

As the reformer/combustion unit is intended to operate over a wide range of flow rates, it may be preferable to optimise the unit for a low flow rate and use a plurality of such units in parallel to achieve the desired range of throughput. In such an arrangement, the units are advantageously grouped closely for thermal economy and units can be brought into, or taken out of, use via valving arrangements as demand fluctuates.

In another variation of this embodiment, a precombustor may be included so that the combustion gases have reached their greatest intensity of heat output just upstream of, or adjacent to, that position in the reformer where the temperature and the heat input requirements are greatest.

If desired, the reactant fuel and water can be metered together so as to provide an excess of water. The excess water (preferably approximately a 50% excess) is used to minimise carbon monoxide production. The metered fuel and water reactants are preferably heated as liquids under pressure to well above the desired reforming temperature and then flashed to vapour so that they reach the reformer at the desired temperature which advantageously is a little over 300° C.

A preferred precursor from which oxygen may be obtained via chemical processing is hydrogen peroxide; concentrated hydrogen peroxide (HTP) is particularly suitable. The concentrated hydrogen peroxide is decomposed catalytically in a combined reformer and heat exchanger such that the strongly exothermic decomposition reaction transfers heat endothermic to the reactant fuel reforming reaction. Thus, a thermochemical synergy can occur between the decomposition and reforming reactions. It is particularly preferred that the heat is transferred co-currently.

It is preferred for carbon monoxide to be removed from the hydrogen-rich reformed gas flow by the addition of oxygen in the presence of a catalyst. Advantageously the carbon monoxide concentration is accurately measured and up to twice the stoichiometric oxygen requirement is metered in, either as air or oxygen. However, in practice, the concentration of carbon monoxide can be difficult to measure and it is thus preferable to add air or oxygen on the basis of predetermined data of the known oxidation requirements and in a suitable excess, for the conditions under which the system is operating. In the presence of the catalyst, the carbon monoxide is selectively oxidised in preference to hydrogen.

Preferably, the reformed gas stream is cleaned by passing it through activated carbon, or through an ion exchange bed or through a membrane which will selectively allow hydrogen to pass. The membrane may be formed of palladium but, a preferred alternative is a polyamide membrane, which can provide acceptable selectivity and through flow.

It is preferred for reservoirs to be provided in the hydrogen and oxidant flow lines upstream of the fuel cell to minimise changes in gas pressure in the fuel cell due to changes in gas throughput caused by variations in demand. Preferably the reservoirs have as large a volume as possible consistent with available space and weight limitations.

In another embodiment of the invention, the fuel cell is disposed inside a pressurisable container. The pressurisable container is provided with facilities for the various pipes and wires which connect to the fuel cell to pass through the walls of the container via gas-tight connections. Preferably the space defined between the inner surface of the container and the outer surface of the fuel cell is pressurised with an inert gas, such as nitrogen. The pressure in the container may be variable so that the pressure differential across the fuel cell seals is maintainable at a suitable value.

In a variation of this embodiment, the pressurisable container surrounding the fuel cell is considerably larger than the fuel cell so that the space defined between the two serves as a reservoir for one of the reactant gases.

This reservoir is preferably used for air or oxygen storage. In this case, the pressure in the reservoir may be greater than that in the fuel cell so that the air or oxygen can be throttled into the fuel cell, or alternatively the pressure in the container may be less than that in the fuel cell, in which case a small secondary blower can be used to feed the air or oxygen into the fuel cell.

As compressed air and/or oxygen can readily cause combustion, no combustible materials, such as greases or the like, should be used in the reservoir and electrical equipment, such as drive motors for pumps or solenoid valve actuators, should be mounted outside the pressurisable container and operate through glands or the like, in the container wall.

In a further embodiment, a rechargeable battery is provided in parallel with the fuel cell electrical output together with appropriate charging, switching and control means so that a sudden increase in power demand can be met by both fuel cell and battery working together and/or a sudden decrease in power demand may be met by charging of said battery. As a fuel cell system can be slow to adapt to changing power demand due to the time lag in adjusting the gas reforming flow rate, the use of a rechargeable battery in this way is preferred to provide additional power or absorb excess power. In normal steady state running, the fuel cell may maintain a trickle, or higher, charge into the battery to ensure that it is fully available at all times.

According to a further aspect of the present invention there is provided an electrical power generation system for a submarine. In this application, the electrical power generation system according to the first aspect of the present invention further comprises a rechargeable battery and the control means is further operative to cause the battery to be connected in parallel with the fuel cell such that the battery and the control means are operative to:

(a) supply power to initiate the operation of the fuel cell
(b) accept power from the fuel cell to recharge the battery and to maintain the battery at a given level of charge
(c) supply power from the battery in conjunction with the fuel cell thereby to produce a combined power output to match a given power requirement.

In an embodiment of this further aspect, the control means is further operative to allow the battery to supply power independently of the fuel cell.

Figure 2:
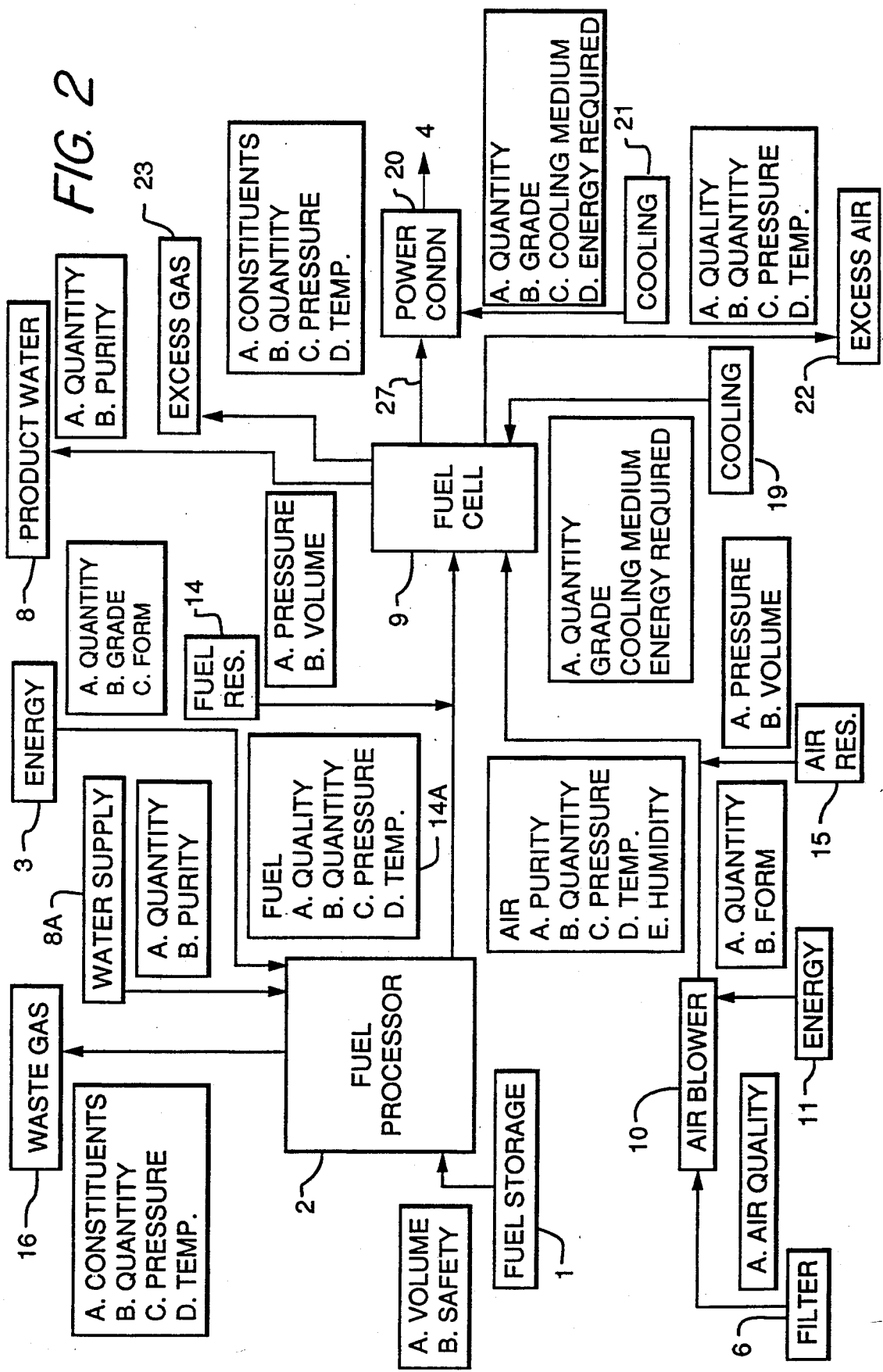
Figure 3:
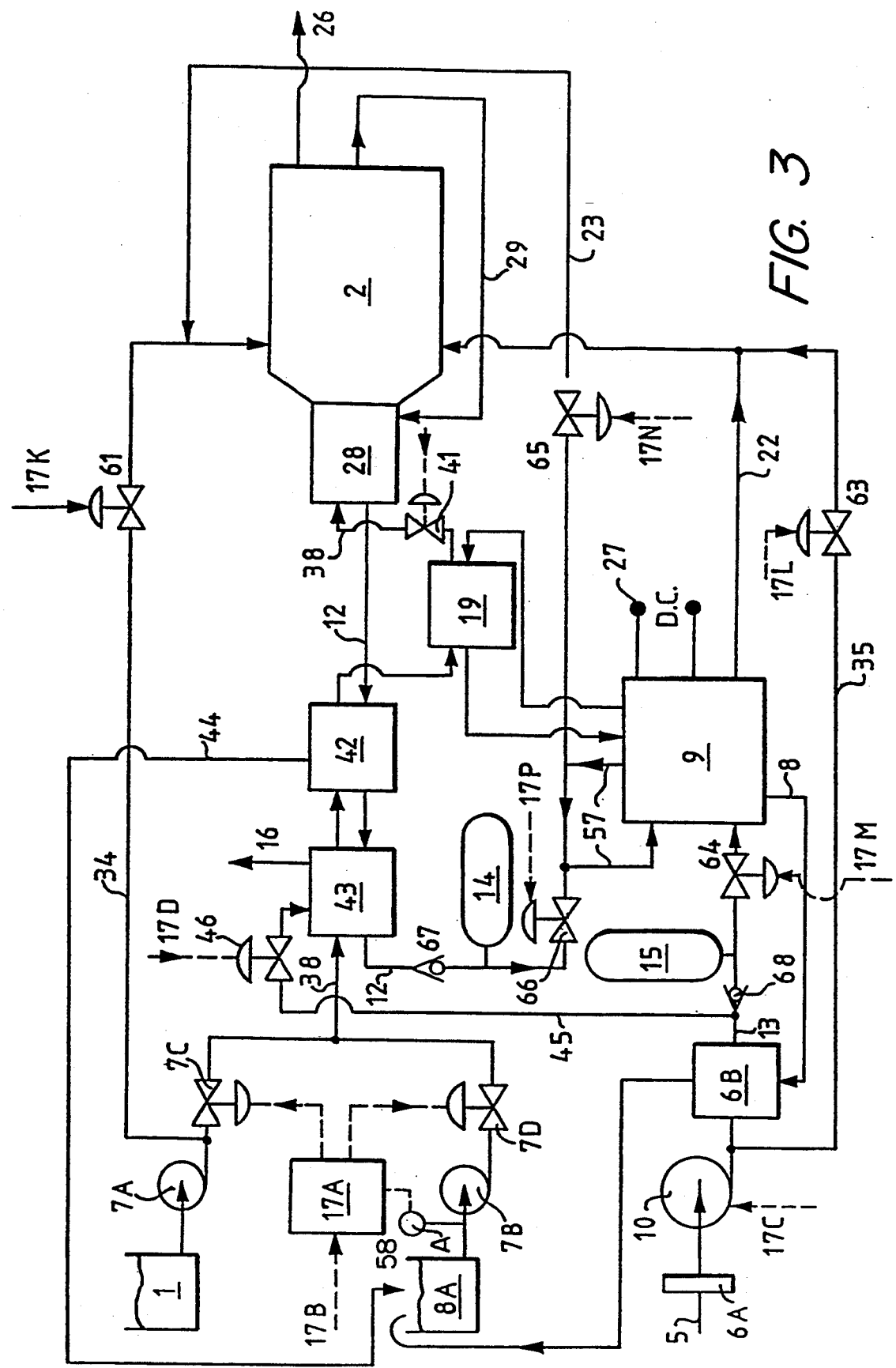
Figure 5:
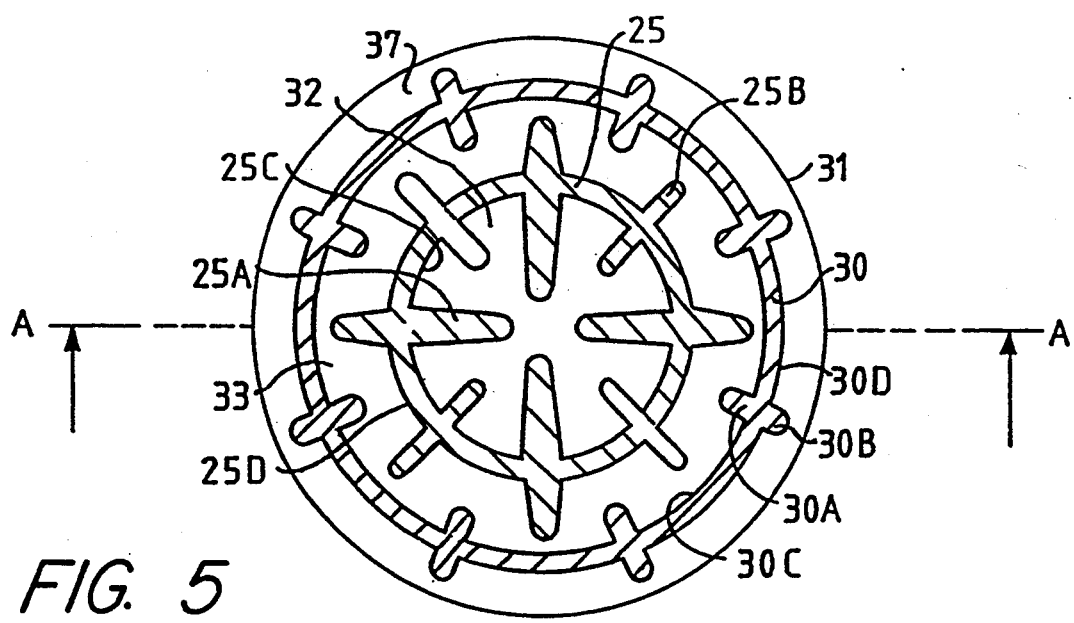
Figure 4:
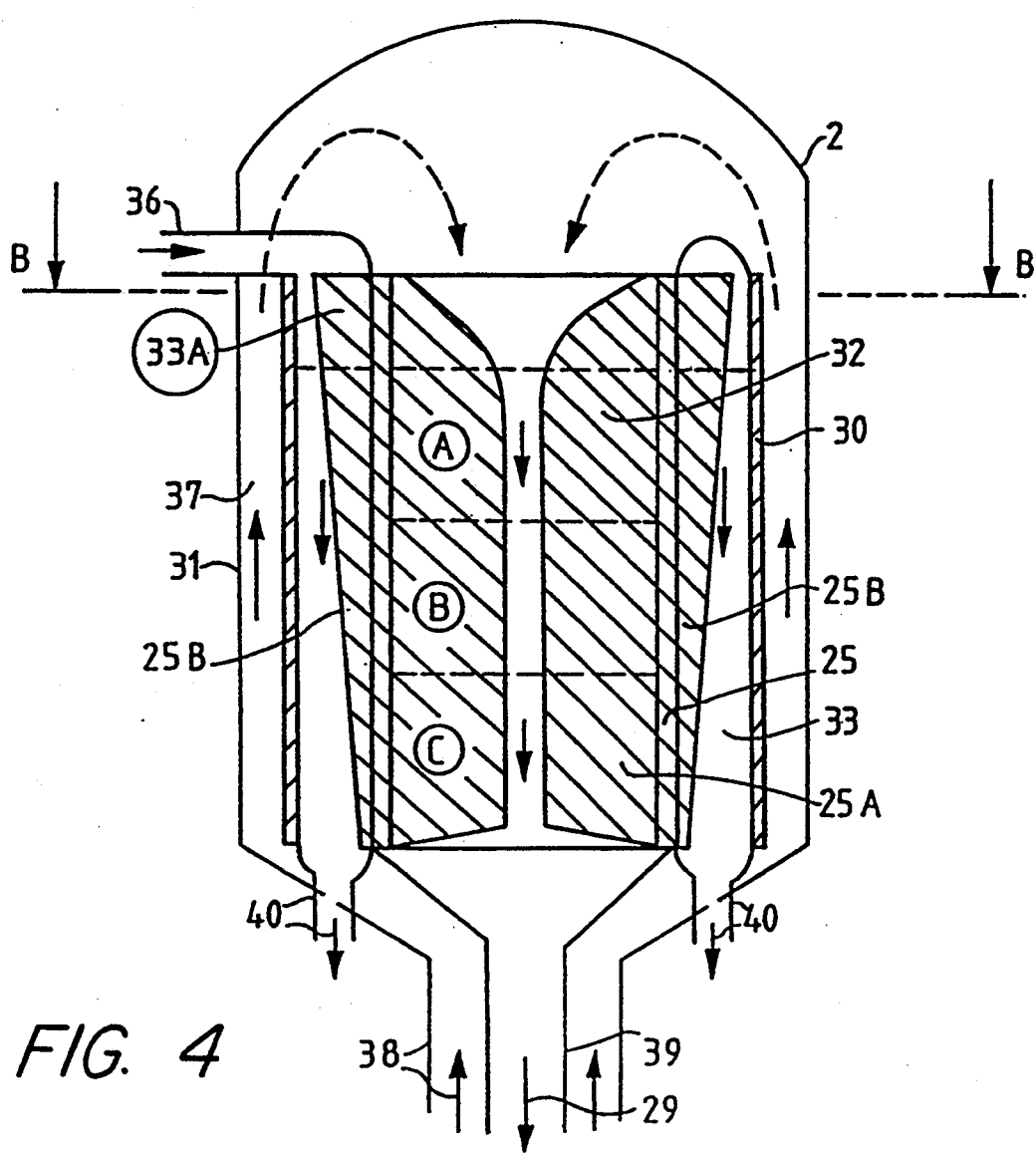
Figure 6:
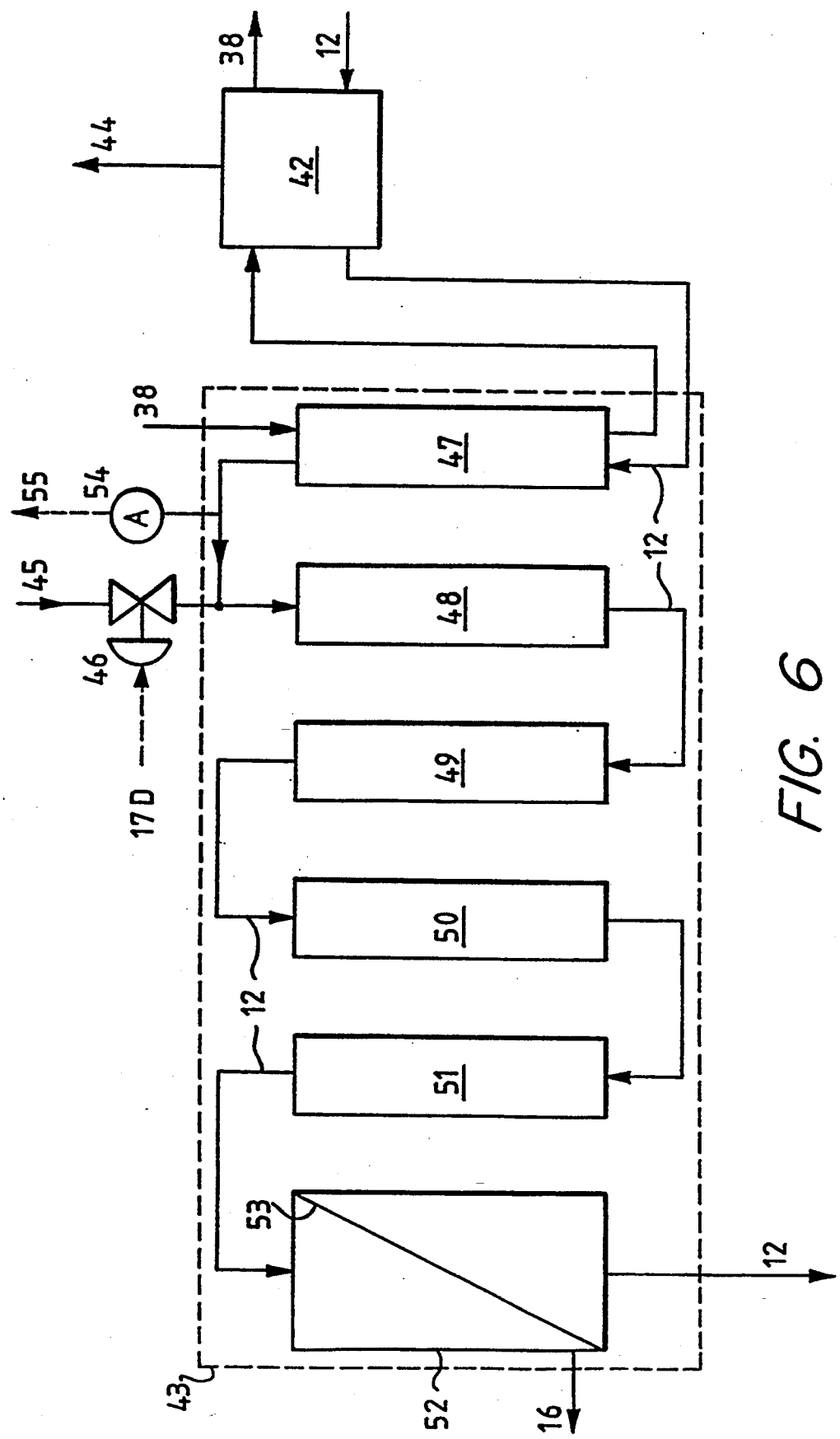
Figure 7:
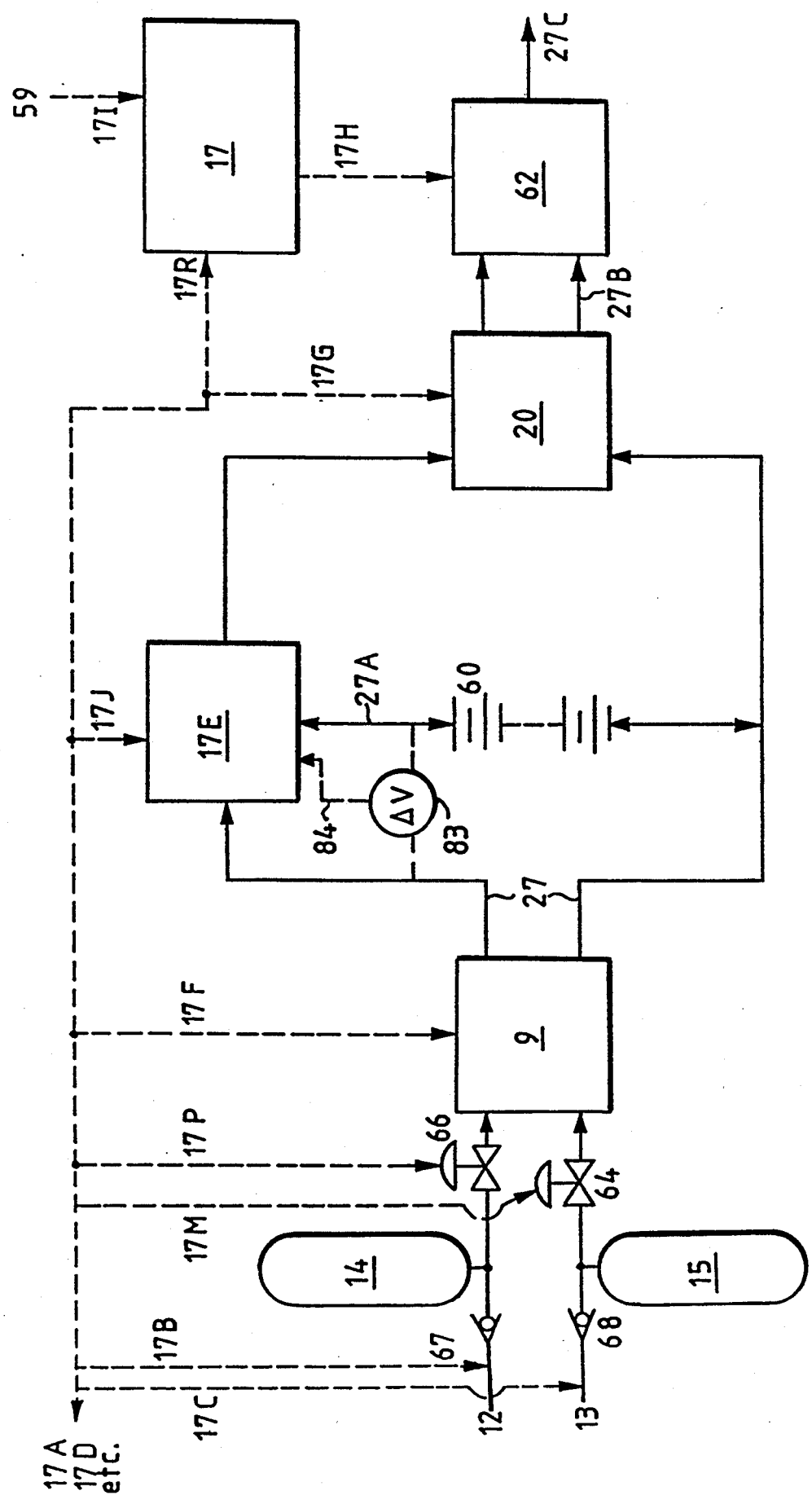
Figure 8:
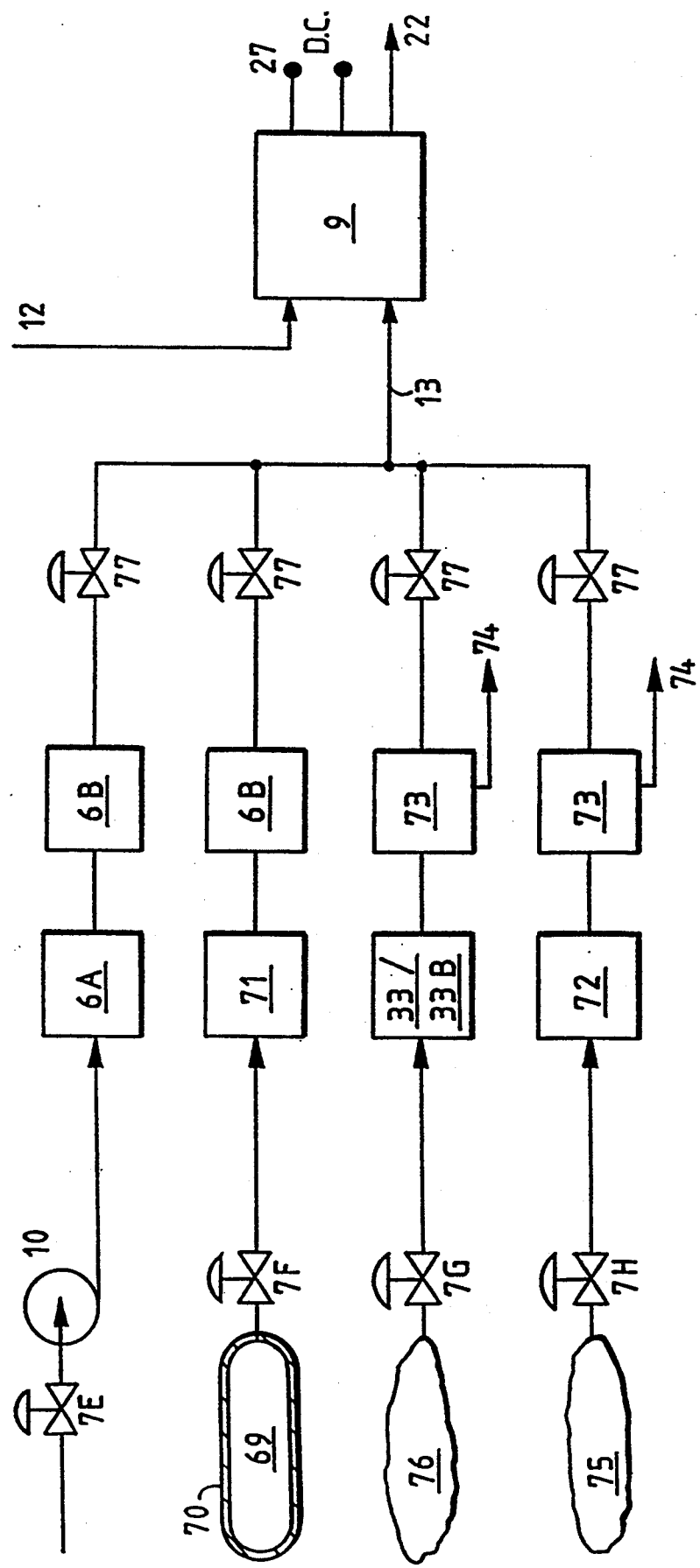
Figure 9:
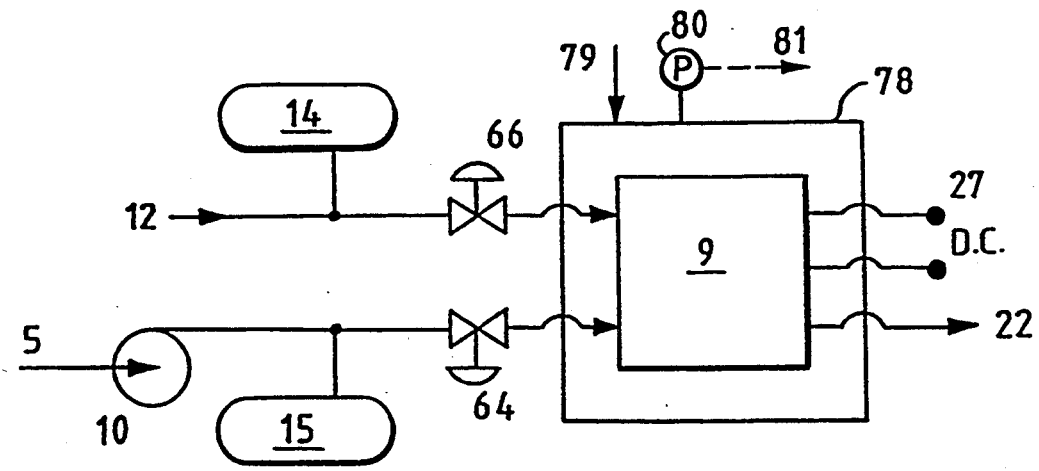
Figure 10:
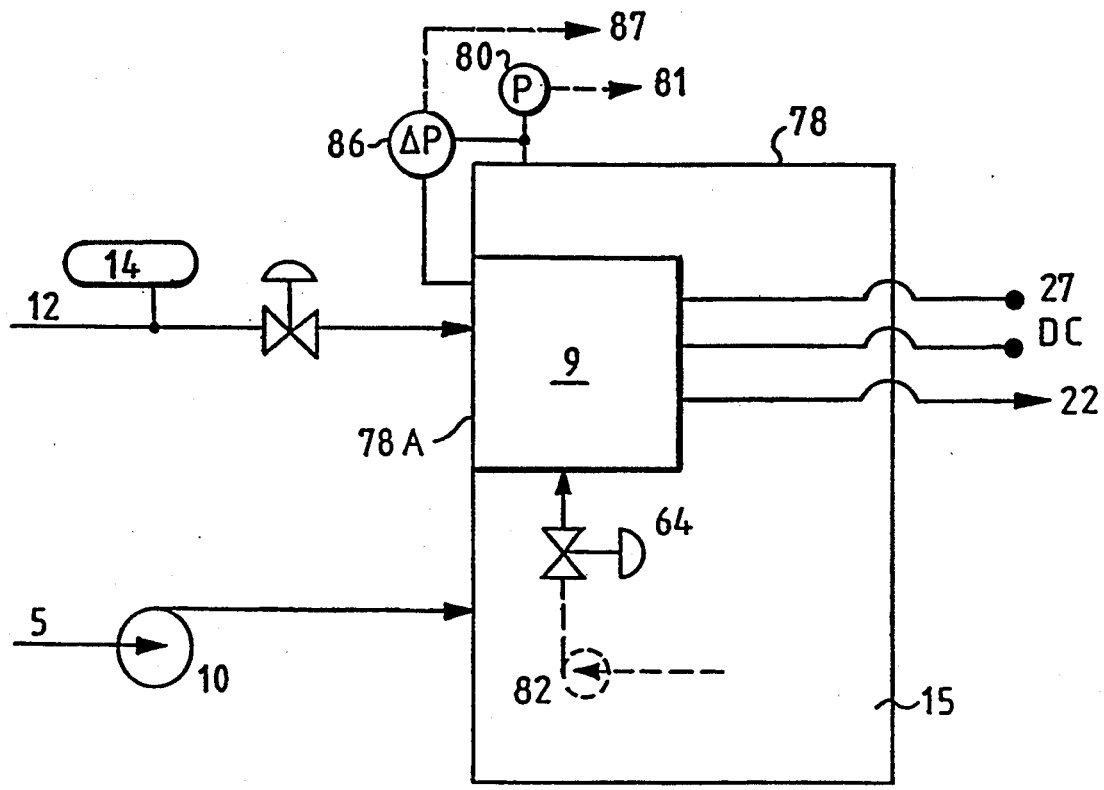

For a better understanding of the invention, and to show how it may be put into effect, reference will now be made, by way of example only, to the accompanying drawings, in which:

FIG. 1 is a block diagram of the supporting systems for a fuel cell power generation plant, FIG. 2 is a schematic process diagram for the fuel cell power generation plant of FIG. 1, FIG. 3 is a more detailed flow diagram of the fuel processor and fuel cell of the plant shown in FIG. 2, FIG. 4 is a sectional elevation of the fuel processor of FIG. 2 taken along the line AA of FIG. 5 looking in the direction of the arrows, FIG. 5 is a cross-section of the fuel processor along the line BB of FIG. 4, looking in the direction of the arrows, FIG. 6 is a flow diagram of the gas clean-up system of the plant of FIGS. 1 to 5, FIG. 7 is a flow diagram showing the basic principles of the control systems of the plant of FIGS. 1 to 6, FIG. 8 is a part flow diagram showing alternative sources of air or oxygen, FIG. 9 is a part flow diagram showing pressurisation of a fuel cell by an inert gas supply, FIG. 10 is a part flow diagram showing the utilisation of a pressure chamber surrounding the fuel cell as an air reservoir.

Referring to FIG. 1, the supporting systems required for a fuel cell power generation plant include:

i) First and second substance storage
ii) First and second substance handling
iii) First and second substance treatment
iv) Control system(s)
v) Cooling
vi) Power conditioning
vii) Waste management To design an efficient system, the above supporting systems must be treated together so that synergy occurs. This is particularly the case with the need to balance heat requirements with cooling needs. Each of the above factors will now be considered.

i) Substances Storage
ii) Substances Handling
iii) Substances Treatment

As an example, the solid polymer type of fuel cell will be used, but the invention is equally applicable to most other types of fuel cell.

The reactants required in the solid polymer cell are gaseous hydrogen and oxygen. Clearly, of these two, the hydrogen is the more difficult to provide. Gaseous hydrogen can be obtained in pressurised cylinders, but these impose a massive weight penalty and the volume of gas thus available is severely limited. Liquid hydrogen provides a large volume of gas but the insulation and other requirements for a cryogenic gas are also penalties. The only other viable source is to produce the gas chemically. The conventional metal-acid reaction is difficult to control accurately to achieve the required volume of gas as and when required and lithium hydride has a weight penalty.

The most suitable sources of hydrogen for this application are by the reforming of fuels such as the paraffinic alcohols, e.g. methanol, and the paraffinic hydrocarbons, e.g. methane. Natural gas is a good source of methane. These reactions are common in chemical processing and well documented. They require the addition of steam and heat in the presence of a suitable catalyst. Typical reactions are:

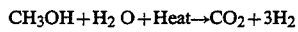

$$CH_3OH + H_2O + Heat \rightarrow CO_2 + 3H_2$$

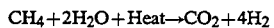

$$CH_4 + 2H_2O + Heat \rightarrow CO_2 + 4H_2$$

Both methanol, which is a liquid, and paraffinic hydrocarbons, which can be easily liquified, are suitable for a fuel cell system which is intended to be mobile, i.e. for use in propelling a vehicle, e.g. a milk float or electric car. If natural gas is available, e.g. the gas supply to a house or from a sewage farm, no storage will be required as the gas will be available in a pipe.

Referring to FIGS. 1, 2 and 3, the fuel storage 1, e.g. for methanol or methane, feeds a fuel processor in the form of a combined reformer 2/heat exchanger 28 via a fuel handling system including a suitable pump 7A. Fuel processor 2 needs heat 3 to function; this can be provided by heat from elsewhere in the process or by burning excess hydrogen in excess gas 23 in a catalytic burner forming part of the fuel processor or by electrical energy 4 from fuel cell stack 9. Low grade waste heat may also be used to warm the fuel between storage 1 and fuel processor 2.

Pure water 8A is needed for the reforming. This may be water 8 supplied from the fuel cell 9. The fuel cell 9 constitutes a source of pure water which is highly suitable for use in reforming. In the reforming process, carbon monoxide and hydrocarbons 16 are produced as by-products. The by-products can be removed by chemical or physical methods as hereinbelow described.

Polyamide membranes provide a physical means of removal but, as well as hydrogen, they do allow small molecules, such as carbon monoxide and methane to pass through, although water vapour, carbon dioxide and higher hydrocarbons (e.g. $C_2$ upwards), which would reduce the efficiency of the fuel cell 9, are rejected. The heat in by-product gas 16 can be used to provide process heat, if this is economical.

Reforming technology is well known and the reactions can lead to different product concentrations. For example, if gases for subsequent combustion are required, the relative proportions of hydrogen and carbon monoxide are not critical as both are combustible. However for use in a solid polymer fuel cell, it is essential to maximise the hydrogen content and minimise the carbon monoxide content as the latter is a poison and reduces the efficiency of the cell and so has to be removed from the gas stream.

The reforming reaction is endothermic, i.e. requires heat, so that the higher the temperature of the reactants, the greater should be the rate of conversion. However, this also results in more unwanted hydrocarbon by-products. Too low a temperature gives an unacceptably slow conversion rate. It has been found that the following approximate temperature profile through the reformer can give an optimum rate of production and quality of product (see FIG. 4).

Zone A, Temperature 300° C. Approx $$CH_3OH \rightarrow 2H_2 + CO \quad (a)$$

Zone B, Temperature 275° C. Approx $$CH_3OH + H_2O \rightarrow 3H_2 + CO_2 \quad (b)$$

Zone C, Temperature 225° C. Approx $$CO + H_2O \rightarrow CO_2 + H_2 \quad (c)$$

The fuel processor (FIGS. 4 and 5) is thus constructed to give:
i) the desired temperature profile in the reformer,
ii) the maximum rate of heat transfer into the reformer consistent with achieving The desired temperature profile,
iii) the maximum rate of heat transfer to the reactant gases consistent with achieving the desired gas inlet temperature to the reformer,
iv) the most efficient heat transfer possible, i.e. generating the heat as near as practicable to the point of requirement, and
v) the fastest response time to changing demands.

The fuel processor of FIGS. 4 and 5 embodies all the above features, but other arrangements are possible and may be chosen to favour preferentially one, or more, particular feature.

The fuel processor 2 includes a reformer 32 defined by reformer housing wall 25 formed by the extrusion or casting, of a metal or alloy having high thermal conductivity and not adversely affecting the reforming reactions. As can be seen from FIG. 5, fins 25A and 25B extend both radially inwards and outwards respectively from the wall 25. Concentrically disposed around wall 25 is a combustion housing wall 30 also formed by extrusion or casting and also having fins 30A and 30B extending radially inwards and outwards from the wall 30. For clarity, fins 30A and 30B have not been shown in FIG. 4. A further concentric wall 31 provides the outer cylindrical surface of the fuel processor 2.

The fuel processor 2 thus contains 3 flow regions. The central one includes the reforming chamber 32. This is packed with pellets of a reforming catalyst (not shown) between fins 25A. Advantageously, fins 25A and the circumferential surface 25C of the wall 25 are also coated with catalyst, e.g. by vapour deposition, or by rolling catalyst powder over the hot metal surface. The preferred reforming catalyst is a mixture of the oxides of copper and zinc and other suitable metallic compounds in their reduced, or partly reduced, form, on a suitable substrate.

The annulus between reformer housing wall 25 and combustion housing wall 30 is the combustion chamber 33. Here a combustion catalyst is applied to fins 25B and the circumferential surface 25D of the wall 25. Combustible material comprising a fuel, e.g. methanol, via pipe 34 (FIG. 3), and/or excess gas from the fuel cell 9, via pipe 23 (FIG. 3) and oxidant 5 e.g. air or oxygen via pipe 35 (FIG. 3) and/or excess air from fuel cell purge 22 (FIG. 3) are fed to the combustion chamber 33 and enter via pipes, e.g. 36. The gases mix in a preheater zone 33A in the combustion chamber 33 and combustion commences, full temperature being reached as the gases (moving downward), approach zone A of the reforming chamber 32. The products of combustion leave the reformer via pipe 40.

The third flow region of the fuel processor 2 is preheating chamber 37 constituted by the annulus between walls 30 and 31. In this chamber, the fuel to be reformed is heated by the combustion reaction taking place in the combustion chamber.

The purpose of using fins 25B and surface 25D covered in a catalyst is to promote catalytic combustion so that the combustion actually occurs in contact with the metal and the heat is conducted directly along fins 25B, through wall 25, and along fins 25A to the unreformed gas waiting for heat to enable the reaction to occur. The pattern of fins 25A (FIG. 5) is such as to bring as much heat in as uniformly as possible over the whole cross section of the reforming region. Even so, there will be a temperature gradient downwards and radially inwards to a minimum along the axis of wall 25 due to the greater distance over which the heat is conducted.

Referring to FIG. 4, the reforming chamber 32 has three temperature zones A, B and C. Fins 25A are reduced in size at the top alongside preheat zone 33A and then maintained at their full radial extent through zones A, B and C as the purpose is to achieve essentially constant temperatures in the radial directions. Fins 25B on the other hand are tapered downwards to pass progressively less heat into zones B and C, thus promoting the desired temperature in the zones.

Fins 30A and 30B may be of equal width along their whole length as their purpose is merely to preheat the reactants (methanol and water) to around 300° C. prior to entering zone A of reforming chamber 32. It will be noted that fins 25B are larger than fins 30A. This is because more heat has to be conducted into reforming chamber 32 to provide the heat for endothermic reaction than has to be conducted into preheating chamber 37 to provide the sensible heating of the reactants.

The inner surface 30C and the surfaces of vanes 30A of the chamber 30 may not necessarily be covered by catalyst, as the greater heat transfer is likely to be required radially inwards towards the reforming chamber 32, rather than outwards towards the preheating chamber 37. However, heat transfer to the chambers 32, 37 may be optimised—for example the surfaces 30A and 30C may be only partially coated with catalyst, or may merely be roughened. Similarly, the surface 30D and the surfaces of fins 30B may also be roughened to give some improvement in the heat transfer.

The reactants 38 to be reformed are introduced into the reforming chamber such that the flow of gases in the reforming chamber 32 and those in the combustion chamber 33 are co-current, i.e. the greatest heat transfer occurs in zone A where the temperature difference and heat requirements are greatest. As the combustion gases move downwards, there is less gas left to be combusted and the temperature falls. Thus, in combination with the profile of fins 25B, the desired temperature zones are achievable in reforming chamber 32.

Conversely the gas flow in combustion chamber 33 and preheat chamber 37 is countercurrent as the requirement here is to raise the bulk reactant gas temperature to that required to enter the reforming chamber 32. Thus the temperature differentials at the inlet and outlet are maximised to give the maximum heat transfer efficiency. Clearly if preheating efficiency is maximised, there will be more heat available to pass to the reforming chamber 32.

The parameters necessary to optimise the two heat transfer requirements as outlined above, are, for example, the location of the surfaces to be coated with catalyst; the size, number, spacings and profile of the fins; the configuration of the fins e.g. straight or helical to promote turbulence; the direction of gas flow i.e. co-current or countercurrent, etc.

Although not shown in FIGS. 4 and 5, unprotected heating elements may be disposed in the reforming chamber 32. Though such electrical heating is a parasitic loss to the system, heat is provided directly to the gas stream. Moreover, the surface of the elements will be covered with an oxide layer which can act as a catalyst. This arrangement is preferably used only on specific occasions, for example to start the system from cold or when a step increase in hydrogen production is required.

From the fuel processor 2, the hot reformed gases 29 pass out via pipe 39 to the first heat exchanger 28 and thence to a series of other heat exchange members, i.e. condenser 42 and gas clean-up system 43. Heat exchanger 19 cools fuel cell 9 and transfers the heat to reactants 38. The order in which these heat exchange members occur in the heating/cooling flowline may be varied as desired. However, the condenser 42 removes liquid water and methanol, which are recycled 44 to water tank 8A.

The gas clean-up system 43 reduces the carbon monoxide and higher hydrocarbon content to levels which the fuel cell 9 can tolerate without undue loss of efficiency. Current designs of solid polymer fuel cell are very sensitive to the presence of carbon monoxide and the process of reducing its content to very low levels, e.g. parts per million, begins with the stoichiometric ratio of the reactants.

The overall reforming reaction—(b) above—shows that one molecule of methanol reacts with 1 molecule of water to give one of carbon dioxide and 3 of hydrogen. Thus, ideally a 1:1 stoichiometric ratio of methanol to water should give 100% conversion, assuming adequate heat is available for the endothermic reaction. However this is hardly ever the case in reality. At the start of reaction b, the molecular concentrations of the methanol and water are high; contact between them and subsequent reaction occur in both the gas phase and, more readily, on the surface of the catalyst. The reaction between 2 molecules produces 4 molecules of product. As time passes, the concentration of the reactants drops until eventually the reaction rate is being controlled by diffusion processes. In the absence of water, methanol will decompose to carbon monoxide and hydrogen in accordance with reaction (a).

In order to avoid this problem, excess water, for example about 1.1 to 1.3 times the stoichiometric ratio, can be used. Clearly the extra mass and volume of water will introduce penalties, e.g. weight, size of equipment, extra heating requirement (though most will be recoverable via heat exchangers), etc. However these penalties must be offset against those incurred with a larger gas clean-up system 43, as now will be described.

The main impurities in the reformed gas are water, unreacted methanol, carbon dioxide, carbon monoxide and hydrocarbons e.g. methane, formaldehyde, formic acid, and compounds based on two or more carbon atoms, all of which will reduce the efficiency of the fuel cell. For some impurities, as the reduction in efficiency is cumulative, even small levels of impurity will eventually have a significant effect.

In FIG. 3, the clean-up system is denoted by reference numeral 43 and it is shown in more detail in FIG. 6 where it can be seen that the clean-up system 43 encompasses all the components in the rectangle outlined by dashes. The condenser 42 can, however, also be regarded as the first part of the gas clean-up system where cool reactants 38 cool the reformed gas stream 12. The condensate of unreacted methanol and water obtained in condenser 42 is recycled 44 to the water tank 8A. The gas stream 12 then passes through a first bed of activated carbon 47 to absorb any remaining hydrocarbons or metallic ions. As activated carbon functions better at lower temperatures, the bed is preferably cooled, e.g. by the reactants 38.

The gas stream 12 next passes into a catalytic reactor 48 where the carbon monoxide is preferentially oxidised to carbon dioxide. This is accomplished by metering in small amounts of oxidant 45 via valve 46. Advantageously, the concentration of carbon monoxide is continuously measured, e.g. by analysis meter 54 and accessed 55 by the controlling microprocessor of control system 17 which operates valve 46 via input 17D to deliver 1.5–2.0×stoichiometrical requirements of oxygen. However, the carbon monoxide concentration can be difficult to measure in practice and it is thus preferably to add an amount of air or oxygen based on the known operating condition of the overall system. (The reason for the excess oxidant is the same as that given above). The catalyst in reactor 48 preferentially oxidises carbon monoxide before hydrogen. This catalyst is preferably a mixture of noble metals and suitable metallic compounds on an appropriate substrate. A second catalytic reactor 49 for oxidising carbon monoxide is shown. This may be required if the levels of carbon monoxide are high. Alternatively the two reactors 48, 49 may be connected in parallel via electrically-operated switch-over valves so that a fresh reactor is available if the performance of the reactor being used drops below a predetermined level. The excess oxidant reacts with some of the hydrogen gas.

One disadvantage of the catalytic reactors 48, 49 is that further reactions occur with the methanol vapour present which can result in the production of some undesirable hydrocarbons. Thus, preferably, a second bed 50 of activated carbon is provided.

A problem with the gas processing method described is that copper and, to a lesser extent, zinc ions are found in the reformed gas stream 12. These probably come from the reformer catalyst but unless operating procedures are established to eliminate the problem, they must be removed by ion exchange column 51.

The final stage of the gas clean-up system 43 occurs in gas separator 52 where a membrane 53 which will pass preferentially hydrogen is located. Palladium is traditional material membrane for such a membrane, however a polyamide membrane is preferred. The pores of this membrane, are sufficiently small to block water vapour, carbon dioxide and higher hydrocarbons. These are rejected as by-products 16. However, in addition to hydrogen, some methane and carbon monoxide can pass though the membrane, and continue to fuel cell 9. This gas stream is almost pure hydrogen and is recycled via lines 57, through fuel cell 9. In order to avoid the build up of impurities, the gas is purged as off gas 23 to the burner forming part of the fuel processor.

Though the concentration of carbon monoxide is very low, e.g. below 5 ppm, this gas is adsorbed on the fuel cell elements and progressively reduces their efficiency. To rectify this, the fuel cell may be periodically purged of the hydrogen gas, e.g. with nitrogen, flushed with oxygen or air to oxidise the monoxide and remove the carbon dioxide formed, and then purged again prior to readmitting hydrogen rich gas.

It will be noted that two pumps 7A, 7B, under the control of unit 17A of the control system 17 meter the required quantity and ratio of methanol and water at the correct pressure into the pipe for reactants 38. As methanol and water condensate is recycled 44 from condenser 42, an analyser 58 is used to determine the exact methanol concentration so that unit 17A can determine the exact quantities of methanol and water to be passed via valves 7C and 7D, respectively to give the required mixture.

The pressure applied by pumps 7A, 7B is sufficient to keep the methanol/water mixture in the liquid phase until heated to well above 100° C. Advantageously the mixture is kept as a liquid until it reaches, or has passed through, preheating chamber 37 in fuel processor 2, when it is flash evaporated via a valve (not shown in FIG. 4). Although the valve through which the mixture is flash evaporated is preferably located after the preheating chamber 37, in order to transfer as much heat as possible whilst the mixture is in the liquid phase, the need for heat transfer economies in fuel processor 2 and heat exchanger 28, and also compactness of design of the fuel processor, may preclude the placing of the valve in the fuel processor 2. Hence, as shown in FIG. 3, the valve 41 may be placed in the next most favourable position, which is immediately upstream of heat exchanger 28. Though flashing is an adiabatic process and so the temperature will fall slightly, the liquid is heated to well above 300° C. so that, after flashing, the gases are at the required temperature to enter the reforming chamber 32. The advantages of this are:

i) better mixing of reactants
ii) no problems with azeotropes
iii) less problems are involved when heating a single phase flow
iv) the reactants retain their sensible heat
v) it is energetically easier to apply pressure to a liquid than a gas and the resulting pressure, even after flashing, will drive the reactants and products through the whole gas processing system, including membrane 53, to the fuel cell 9.
vi) heat transfer to a liquid is more efficient than to a gas due to the higher boundary layer coefficients.

The oxidant supply 5 is normally from air in which case the treatment 6 normally involves only filtration 6A and humidity adjustment 6B (FIG. 3). If contaminants are present in quantity, cleaning may be required. Though air is the obvious source of oxygen, other sources are available, e.g. liquid oxygen or oxygen from chemical processes such as the decomposition of hydrogen peroxide.

FIG. 8 shows in part block diagram form the principle of using, and changing between, different sources of oxygen. The need to change between different sources of oxygen can be best exemplified by the application of the electrical power generation system of the present invention to provide power for submarines and so will be described in this context.

When on the surface, or snorting (i.e. at periscope depth), air 5 is drawn in through valve 7E by blower 10 and passed via filter 6A, which may also remove entrained droplets of sea water, and humidity controller 6B to fuel cell 9. Alternatively, air 5 may be drawn from the atmosphere inside the submarine, which is then replenished via the snorting system. When the submarine dives, valve 7E is closed, to prevent the ingress of seawater, blower 10 is switched off and oxygen from another source is used instead.

A second suitable source of oxygen may be as a cryogenic liquid 69 in an insulated tank 70. Liquid oxygen (LOX) flows via valve 7F, evaporator and heater 71 and humidity controller 6B to fuel cell 9. In practice, evaporator and heater 71 can be provided in two stages. In the first stage sea water can be used to provide heat for evaporation and in the second stage a source of heat can be used to warm the gas up to a suitable temperature for admission to fuel cell 9.

A third suitable source is the use of dilute hydrogen peroxide, which decomposes according to the equation below:

$$2H_2O_2 \rightarrow 2H_2O_2 + O_2 + \text{heat.}$$

Above a certain concentration, hydrogen peroxide will decompose autocatalytically, i.e. the heat of reaction is sufficient to supply the activation energy needed for continuation of the decomposition. Preferably hydrogen peroxide 75 is used and decomposition 72 occurs in the presence of a catalyst. Though once started, the reaction is autocatalytic, some heat (not shown) could be needed to start the reaction. A condenser/water separator 73 removes liquid water 74.

A further alternative is to use concentrated hydrogen peroxide, known as HTP, as both the source of oxygen and a source of heat. In this case hydrogen peroxide from storage 76 is passed directly to fuel processor 2 and admitted to the second chamber 33 where the heat of decomposition is transferred directly to the reforming chamber 32 as described hereinbefore. After leaving chamber 33 and transferring residual heat (not shown), the steam and oxygen can be passed through a condenser/water separator 73 and the uncondensed gas passed to fuel cell 9. It is possible that catalytic combustor 33 may fulfil both the role of HTP decomposition, when the submarine is submerged, and fuel (e.g. methanol) combustion when air is being used as the source of oxygen. If not, separate zones 33 for combustion and 33B for HTP decomposition can be provided, both embodying the heat transfer principles hereinabove described. Different piping will also be required downstream of the fuel processor 2 e.g. heat transfer and disposal of waste combustion gas 26 for the combustion products, and heat transfer, condensation and passing to fuel cell for HTP decomposition products.

The hydrogen peroxide storage 75, 76 may advantageously be in polythene bags external to the pressure hull of the submarine. Depth pressure would thus force the liquid into the submarine when required so that pumps would not normally be needed and so are not shown. However, near the surface, where pressure differentials are less, pumping of hydrogen peroxide could be required.

Valves 77 allow one or more sources of air or oxygen to be admitted, via pipe 13, to fuel cell 9. Control systems 17 operate the appropriate valves and adjust the operating conditions, e.g. according to whether air or oxygen is supplied so that the source of oxidant can be changed at will without significant variation in the level or quality of output current 27 from fuel cell 9.

The above described method and apparatus for using different oxygen sources make possible the design of a submarine with a fuel cell as the single source of primary power. There would thus be no need for a diesel engine to recharge batteries.

The hydrogen and air are passed from the reforming chamber 32 and from oxidant supply 5 (by a blower 10 driven by an energy source 11) respectively via fuel line 12 and 57 and air line 13 respectively to the fuel cell 9. Reservoirs 14 and 15 are provided off each line to accommodate surges in the gas flows or to provide for momentary shortages. The most likely reason for surges or momentary shortages in the gas flows is be stepchanges in the power output 4 of the fuel cell 9 as will be explained hereinafter.

iv) Control

An integrated control function is indicated by the single block 17 (FIG. 1). The role of reservoirs 14 and 15 as one aspect of control has been mentioned. This is emphasised in boxes 14A and 15A (FIG. 2) respectively where item B in both refers to 'quantity'. The text alongside each flow line of FIG. 2 indicates the individual parameters which must be monitored and controlled in order to ensure that the whole system will operate smoothly and reliably and be available as and when the demand arises.

As is evident, there is a considerable control problem in just maintaining steady state conditions. When the fuel cell output changes from one power level to another, the problems are exacerbated, particularly due to time lags. For example, when the power level is increased, more fuel and air will need to be passed via the fuel processor and by blower 10 respectively. Although electrical energy 11 can easily be increased to blower 10 to increase the air flow, the fuel processor involves a considerable time lag and will require more water 8A even though the output of water 8 from the fuel cell 9 will not yet have increased to match the requirement. Thus the water supply 8A is provided with buffer capacity to meet demand during transients.

This is one example of the interdependencies of the various parts of the system and the implications of providing a fully integrated control function. In practice modern computers or microprocessor-controlled control systems have the capability to check the readings from all the instruments monitoring all the parameters shown in FIG. 2 and cause the necessary adjustments to counteract deviations from the norms. When transients occur, the control system simultaneously, or consecutively, alters many of the parameters listed until a steady state is reached at the new operating level. The fuel cell power system of the invention is well suited to use on an electrically powered motor vehicle. In such an application, though a battery can be used as a 'buffer', the control system constantly changes the operating level as the driver controls the speed of the vehicle in traffic.

Thus the control system is developed for the particular application with all the necessary facilities of linear, proportional, differential, integral, etc. forms of control plus the usual feed-back and feed-forward loops and any other requisite features. Although the actual control system is preferably electronic in nature and accepts electrical inputs from the various sensors, other types of control are possible for specific parts of the system.

The basic principles of the control system will now be described with reference to FIG. 7. The control system 17 is shown communicating with all parts of the fuel cell power generation system 17A-R; the dashed lines are intended to refer to both the input of parameter data, e.g. as shown on FIG. 2, the input of data from specific components, such as 54, 58 and 81, and to the flow of control signals. The feedback from each and every item of controlled equipment, controller, monitor, etc., to control unit 17 is represented by arrow 17R. In FIG. 7, signal 17F refers to any control instructions which may have to be sent to fuel cell 9, or return from any operating parameters monitoring the fuel cell condition. 17G and 17J refer to control signals to and return signals from electrical conditioning 20 and selection 17E equipment respectively. 17H monitors the usage of electrical power 27C as a selective, or total cut out could be required to protect the fuel cell 9 (or battery 60) from excessive demand.

Operator input 59 is received which causes control system 17 to check the current situation via input 17I and respond. For example, the first input 59 will be that required to start the whole system from cold. Signal 17J will initiate electrical power selector 17E to draw power from battery 60 and pass it via power conditioner 20 to usage 62. In this case, the usage 62, will be pumps 7A, 7B and blower 10, via signals 17B and 17C (also see FIG. 3), to admit methanol, water and air to combustion chamber 33. Valves 61 (via 17K) and 63 (via 17L) control the flows of reactants in much The same way as does a conventional carburettor on a cat's engine, e.g. with the equivalent of a choke control when cold and ensuring nearer stoichiometric conditions, when warm. Electrical ignition (not shown) may be used, if necessary, to start the combustion more easily. Electrical heating in reforming chamber 32 may also be required.

When combustion chamber 33 is at operating temperature, valves 7C, 7D are opened (via signals from control unit 17A) to admit The reactants to the fuel processor and so produce hydrogen in the gas stream 12. When the inlet pressure has reached the required level, the hydrogen and the oxidant are admitted to the fuel cell 9 via valves 66 and 64 (controlled by signals 17P and 17M) and power 27 is produced. As the fuel cell 9 operating temperature is about 70° C., the efficiency and amount of power produced 27 will gradually increase as the exothermic fuel cell reaction causes the temperature to rise. On reaching the operating temperature, fuel cell cooling system 19 cuts in to maintain the required temperature. The output heat will, of course, be available for process heating in the rest of the system.

The first power 27 produced from fuel cell 9 passes via the selector 17E back into the battery 60 to replace the charge used to start the pumps 7A, 7B, blower 10 etc.

When the fuel cell power generation system is operating normally at a first steady state, there will be regular demands via input 59 to change to second steady states. For example, if the system is propelling a motor vehicle, the driver may wish to accelerate or if the system is supplying power to a house, the occupant may wish to turn on an extra electrical appliance, such as fire. As will be apparent, the need to process fuel at a rate appropriate to the fuel cell demands results in a time lag so that a rapidly changing output 27 in response to an input 59 is not possible from the fuel cell alone. The solution to this problem will now be described.

A typical solid polymer fuel cell stack 9 may consist of, say, 35 individual cells capable of producing a maximum power output of 5 kW using air as the supply of oxidant. Power levels of up to 8 kW are possible with pure oxygen. If the level of current drawn from the cell increases, the voltage will fall. The correct procedure is to increase the flow rate of the reactants and the pressure of the gases, i.e. to increase the molecular density of the fuel cell 9 before the level of power removed is increased. Fail-safe systems can be incorporated into the fuel cell control to protect the fuel cell from accidental damage.

As in practice, the operator does not want a power build-up delay of, perhaps, a few seconds, the battery 60 is used as a "buffer" supply to meet the shortfall. Assume, for example, that power demand 27A is 100 Amps and input signal 59 requires 125 Amps. Controller 17, via 17E can take 25 Amps (27A) from battery 60 so that the input to the power conditioner 20 would be 100 (27) plus 25 (27A) giving a total output of 125 Amps (27B). Thus demand 59 for a power usage 62 of 125 Amps is immediately satisfied. The demand 27C could be either as (mechanical) rotational power for the vehicle, or electrical power, or as each application required.

Simultaneously, other signals, e.g. 17B, 17C etc, cause an increase in the throughput of reactant gas and oxidant respectively so that, after a few seconds, the flow of gases to fuel cell 9 reach the equivalent of a power output of, say 135 Amps. Power selector 17E then takes 135 Amps from fuel cell 9, passes 125 Amps to conditioner 20 and uses the remaining 10 Amps to recharge battery 60 via connection 27A. The connections to and from battery 60 are shown with arrows at both ends to indicate that power 27A may flow either inwards, to charge it, or outwards, to supply either the needs of the system or an increased external demand.

It is known to supply an external demand from either from a fuel cell o, alternatively, from a battery. However, in accordance with the invention, under normal circumstances, fuel cell 9 is always operating and battery 60 acts as a buffer to meet either excess demand or absorb excess power produced. Selector 17E and conditioner 20 adjust the quality of output power 27B so that it is always appropriate for the usage(s) 62 required e.g. D.C., A.C. or a mixture of both.

Referring to FIG. 3, it will be seen that the pressure of the hydrogen feed to fuel cell 9 is controlled by valves 65 and 66 under the control of signals 17N and 17P, air reservoir 14 and non-return valve 67 and that the pressure of the oxidant gas is controlled by valves 63 and 64 (under the control of signals 17L and 17M), air reservoir 15 and non-return valve 68. The two non-return valves 67, 68 are used to allow fuel cell 9 to be shut down safely in the event of a dramatic loss of inlet pressure, e.g. due to a failure of the oxidant line 45. In the case of both feed gases, the pressures in their lines are greater than the maxima required in fuel cell 9 and the gas flows are thus throttled through valves 64 and 66 to give the required pressures for each particular power output.

The reservoirs 14 and 15 are important in reducing the time lags due to changing power demands. For example, assume the volume of oxidant pipework between non-return valve 68 and fuel cell 9 is V and the pressure is P. Assume that the amount of gas usage is V and this is being replaced by fresh gas V so that the system is in a steady state.

i.e. $PV = \text{constant}$

If now demand is doubled, i.e. the volume used is 2V but it is replaced by only V, pressure will drop to one half that previously so that $\frac{1}{2}P \times 2V = \text{constant}$ If now reservoir 15 is added, this increases the pipework volume to, say, 20V. With a usage of V and replacement of V as before this gives:

$P \times 20V = \text{constant}$

If the volumetric usage doubles and is still replaced by only V, the 'equivalent' volume after one time interval is 19V (20V−2V+1V) so that P will drop by a factor of 19/20, i.e. 5%. As pressure P is greater than that required in fuel cell 9, i.e. the gases are being throttled through valves 64 and 66, the presence of reservoirs 14 and 15 greatly increases the response rate of the power generation system when moving from one demand level to another. If, of course, the demand is being reduced, valves 64 and 66 can be further closed and the pressure in the reservoirs can increase temporarily.

As noted above, the reactions in the fuel cell 9 are between two gases, hydrogen and oxygen which are adsorbed onto the catalytic elements of the fuel cell. Clearly therefore the properties of gases, and gaseous mixtures, are relevant to the reaction kinetics. It is a general rule where two gases react, that the rate of reaction will increase proportionally with increased pressure as the molecules are brought closer together. This effect is more pronounced where Le Chatelier's principle applies, as it does in this case in which three molecules of gas react to give two molecules of (liquid) water. Thus, the greater the pressure inside the fuel cell 9, the more efficient will its operation be, i.e. the greater will be the power output per unit volume.

Unfortunately the construction of the fuel cell requires large numbers of plates and thus does not lend itself to high internal pressurisation since the interface between each adjacent pair of plates must be sealed individually. In practice an internal pressure differential over ambient of about 2 bar is all that can be safely achieved without significant risk of leakage.

As illustrated in FIG. 9, one way to improve the efficiency of fuel cell 9 is to place it in a pressurisable container 78, and to increase the internal pressure to, say, 30 bar. Then the internal pressure of the fuel cell 9 may be raised safely to, say, 31 or 32 bar and the power output will increase dramatically. In one variation of this principle, inert gas 79, e.g. nitrogen, can be used to provide the pressurisation. A pressure gauge 80 monitors the pressure and relays the reading 81 to controller 17.

Another variation is shown in FIG. 10 in which, the container 78 is made larger than is necessary merely to increase the pressure in the fuel cell 9 and is pressurised with one of the reactants, for example, air 5, via blower 10. Thus container 78 can also fulfil the role of air reservoir 15. In this case, the pressure inside container 78 is greater than in fuel cell 9 and air is throttled in via valve 64. Alternatively, the pressure in container 78 may be less than in fuel cell 9, in which case a secondary air blower 82 can be provided.

It should be noted that air, or oxygen, under pressure can lead to fierce fires if combustible material, e.g. grease on pipe fittings, is present. Rigorous attention to design and fitting detail is thus required. In this regard, electrical equipment, such as the motor for blower 82 and solenoid control valve drives should be positioned outside container 79 and operate through the container wall via glands, etc.

Two additional safety features which may be incorporated into the system of the present invention are show in FIG. 10. In the first feature, one wall of the fuel cell 9 forms part of the walls container 78, the common wall is shown as 78A. With this arrangement the hydrogen line 12 does not pass through the pressurised air-/oxygen reservoir 15 so that no leakage of one gas into the other, to form a potentially explosive mixture, can occur. The second feature is the addition of differential pressure gauge 86 to monitor the pressure difference between reservoir 15 and the interior of fuel cell 9. As has been explained above, the seals between adjacent plates in the fuel cell 9 can withstand only a limited pressure differential so that gauge 86, via signal 87 to controller 17 can ensure that this limit is not approached.

Depending on whether the pressure in the fuel cell 9 is greater than or less than that in the reservoir 15 leakage could possibly occur either into or out of fuel cell 9. Accordingly as a further safety precaution, the fuel cell element stack can be placed inside a thin plastic sleeve (not shown) containing both oxygen and hydrogen sensors (not shown). After purging with an inert gas, e.g. nitrogen, the sensors would detect any leakage out of fuel cell 9. In the event of a leakage into the fuel cell 9, the plastic will become pressed on to the outside of the plates and will supplement the action of the seals.

Though container 78 imposes a weight penalty, the additional power output more than compensates.

v) Cooling

As has already been described, it is a feature of the system shown in the Figures that heat is produced in some parts of the system, e.g. in the fuel cell 9, and is required in others, e.g. reformer 2. Thus to optimise the system and maximise the overall efficiency, waste heat is always used. If it cannot be used directly for process heating 3, it may be used for space heating 18, rather than being rejected, i.e. combined heat and power is produced.

FIG. 2 shows that both the fuel cell 9 and the power conditioner 20 have cooling requirements 19 and 21 respectively. However, the excess air and gas flows 22 and 23 respectively and the product water 8 all remove heat from the fuel cell 9. All these flows are used effectively, as will be explained, but if the water 8 is to be collected for use in the reformer 2, the gas flow must be cooled to allow the steam or water vapour to condense (in humidifier 6B) and be collected in tank 8A. This will, of course, provide latent heat.

It is noted that air 5 is heated 6B after having been compressed so that the volume of air to be compressed, and hence the energy required by blower 10, is minimised. Furthermore, the coefficient of heat transfer is likely to increase as the density of the air being heated increases. After the water has been extracted, excess off gas 23, which contains unused hydrogen (and carbon dioxide, if this was not removed after reforming) is passed to the burner which is an integral part of the fuel processor. Here the gas is burnt with the excess air 22 from the fuel cell and any additional air 35 required. The reformer 2/burner unit is designed as a single entity to ensure maximum heat transfer to the reformer as well as effective use of the waste heat in gas streams 22 and 23. For start up conditions, when there would be no excess streams 22 and 23, pure methanol may be used as the fuel until a steady state has been achieved.

Depending on the particular design of the system, the exhaust 26 from the burner of the fuel processor may be at a high pressure whence it could be discharged via a turbine (not shown) connected to a small generator (not shown) to supplement the electrical power output 27 from the fuel cell 9 to conditioner 20. Though this contribution might be small, it would nevertheless be significant on a large continuously-running system and is all part of maximising the synergy of the whole system.

If exhaust 26 cannot be used via a turbine, it can be used, via a heat exchanger (not shown) to provide either process heating 3 or space heating 18. Thus the fuel cell power generation plant disclosed herein can also become a combined heat and power installation, thus further increasing the overall efficiency of the system, e.g. for use in a domestic application or in an isolated location.

Referring again to FIG. 3, it will be noted that heat exchanger 28 is provided to transfer heat from the hot reformed gas flow 12 to the methanol/water feed 38 prior to reforming. The cooled reformed gas flow 12 allows unreformed methanol and steam to be condensed and removed in condenser 42, before selective oxidation of the carbon monoxide present and passage via line 57 to fuel cell 9.

vi) Power Conditioning

The level of power output 27 from the fuel cell 9 depends on the rate at which fuel and air are supplied to the individual cells and possibly also the condition of the cells. Each cell produces a small current at a low voltage and, depending on how the cells are connected together, the output 27 could be a high current at a low voltage, or a lower current at a higher voltage. In either case, power 27 is direct current.

Power conditioner 20 is used to convert the fuel cell output into a form of electricity which is readily usable. At its simplest, power conditioner 20 may use the power 27 to charge a series of batteries and/or supply power directly, for example, to an electrically powered vehicle. In this case, the fuel cell may run at a fairly constant output providing driving power and maintaining the battery at a suitable level of charge for sudden acceleration. Power may also be supplied to the battery via regenerative braking.

In a further application, e.g. a domestic power unit, the required output 4 would preferably be A.C. Though a battery back-up is likely to be included, for example to start the system, conditioner 20 can convert the D.C. cell output 27 to A.C. power. Optionally, complex electronic circuitry may be provided to stabilise the frequency and voltage when transient changes in demand occur, e.g. when an electric fire is switched on. A combination of A.C. and D.C. power outputs is possible.

In the application of the electrical power generation system of the present invention to a submarine there could be a need for power in excess of the maximum available from the fuel cell 9, e.g. to escape from an enemy. Thus, if say 600 kW of power was needed and the fuel cell 9 could supply only 400 kW, the shortfall of 200 kW can be supplied from the battery for the required time, say 15 minutes. At the end of this time, the submarine would slow down, or stop, and proceed to recharge the batteries as quickly as safely practicable.

When conventional diesel-electric submarines surface to recharge batteries, the whole vessel can be well ventilated to remove any gases which are produced in the recharging. With a fuel cell powered recharge, whilst the vessel is submerged this is not possible and steps must be taken to minimise gassing; the gases produced are hydrogen and oxygen (which form an explosive mixture) but they can be contaminated with a mist of sulphuric acid, if gassing is vigorous.

In order to recharge battery 60 as rapidly as possible without risk of significant gassing, the output voltage from fuel cell 9 must be maintained just greater than that of battery 60, e.g. 0.1–0.2 volts greater. In order to control this parameter accurately, a differential voltmeter 83 (FIG. 7) can be used, e.g. to measure the difference in voltage ($\Delta V$) between fuel cell output 27 and the battery voltage. The readings are fed continuously 84 via electric power selector 17E to the electrical control system, 17R and 17, as well as 17G and 17H to allow for other power usage of the vessel.

The value of $\Delta V$ (83) gives a feed-back of the condition of battery 60. Possible methods which can be used by the control system 17 to maintain $\Delta V$ constant include:
 i) Regulation of one or both of the reactants. This involves accurate control of one, or more parameters, e.g. gas pressure, gas concentration and/or volumetric flow rates. In a practical system, it is preferable that one reactant is controlled very accurately and the other less so; this provides fine control of $\Delta V$ via the accurate control of the one reactant without allowing the other reactant to become a limiting factor.
 ii) Conditioning of power output. Precise electrical/electronic control of the fuel cell power output is achieved by units such as 17E or 17 or equivalent.

In practice, elements of both methods of control can be used together, as it must be remembered that there are always other demands for power usage 62, e.g. the hotel lead of the submarine, operation of surveillance or ballast systems, etc., which will tend to cause step changes in the electrical parameters which control of reactant parameters alone could not follow quickly enough.

Thus, by means of the present invention a submarine's battery may be:
 i) Charged without significant gassing.
 ii) Floated, i.e. maintained in a state of instant readiness should a power demand rise.
 iii) Used to power DC (and AC) systems, either separately, or in conjunction with the fuel cell.

The present invention makes possible a design of submarine based entirely on fuel cell and battery technology—i.e. there is be no need for a diesel engine.

A submarine has three mode of operation, i.e.
 i) on the surface
 ii) snorting, i.e. at periscope depth
 iii) deep dived When on the surface, or snorting, air 5 is the preferred source of oxygen for fuel cell 9 via blower 10 (FIG. 8) but when deeply dived, liquid oxygen (LOX) 69 or hydrogen peroxide 75 or 76 will become the source instead. In submarine technology, it is standard practice to have two entirely separate and independent systems of propulsion, e.g. one or more diesel engine and a battery or a nuclear reactor and a battery (and usually a diesel engine too). In the case of the present invention the fuel cell 9 is more versatile than the diesel engine as it is the prime mover for the submarine whether surfaced, snorting or dived and additionally can recharge the battery in any of these three operational modes.

In order to maximise reliability, the fuel cell power systems can be duplicated, e.g. port and starboard, and/or sub divided. For example, multiples of a small standard design of reforming unit and fuel cell may be provided or one/all of a plurality of reforming units 2 may feed one/all of a plurality of fuel cells 9. In this way, failure of one or more reforming units or fuel cells will not cause a total loss of fuel cell power as the failed unit(s) can be isolated and bypassed. This gives greater availability of the power plant compared to that of one, or two, diesel engines.

vii) Waste Management

It is a feature of the system that heat is produced in some parts of the system e.g. the fuel cell stack 9 and is required in others e.g. the reformer 2. Thus to optimise the system and maximise the overall efficiency, waste heat is always used. If it cannot be used directly for process heating 3 it may be used for space heating 18 rather than being rejected in which case combined heat and power is produced. The management and disposal of waste is indicated in FIG. 1 by bottoming cycles 85.

As has been explained, any waste flows which cannot be used economically either to provide sensible heat for heat exchange, for chemical energy for combustion or for space heating are preferably discharged to atmosphere via a catalytic converter, e.g. hydrocarbons 16, or to a drain.

As has been mentioned above, the methanol 1 and water 8A are pressurised 7A, 7B as liquids and then heated prior to being flash evaporated into the reforming chamber 32. This is in preference to heating then pressurising. This preference has four advantages in that a liquid is easier to pressurise (in terms of energy requirement), is more efficient to heat (in terms of heat transfer), when heated the pressure increases further and a liquid pump is physically smaller than a gas compressor. As has also been explained, the reforming unit 2 and fuel cell 9 also operate more efficiently at high pressure. Thus all the waste streams, e.g. 16, 22, 23 and 26, are rejected at high pressure.

Any or all of these waste streams can be used as sources of heat for one or more of:
  i) process heating, e.g. to provide heat for a reactant stream;
  ii) space heating, e.g. so that the fuel cell power generating plant provides combined heating and power (CHP);
  iii) power generation, e.g. by heating a liquid refrigerant gas to be expanded adiabatically via a turbine in a conventional electric power generating thermodynamic cycle.

In addition to the above, the pressure energy of one or more of the waste gas streams 16, 22, 23 and 26 may be used, whether or not the stream has already been used as a source of heat, by expanding the gas adiabatically through a turbine (not shown). The turbine may be used to drive either a generator to produce further electrical power output, or to drive a pump, e.g. blower 10. Any additional electrical power output can be conditioned 17E, 20 and is additive to the gross power output 27B. Any drive to a pump will be via its electric drive motor and can thus replace, or supplement, the drive, i.e. completely or partially replace the electrical current needed to turn the motor; an electrical drive motor will always be needed for the pumps, e.g. blower 10, to start the system from cold.

In the case where the power generation system of the present invention is applied in a submarine the liquid fuels are stored under pressure—for example LOX 69 is stored crogenically under very high pressure and hydrogen peroxide 75, 76 is at the same pressure as the water outside the submarine. In this application, the pressure inside the whole fuel cell power generating system is raised to a pressure slightly above that outside the submarine at its maximum diving depth. This always allows the waste products to be discharged into the sea without the need for further pumping. Combustible gases can be burnt catalytically, cooled to condense the water and the soluble carbon dioxide dissolved in either plain seawater or with a little alkali added. The resulting seawater, or suspension, can be discharged via a valve into the sea. This process has the advantages that no further energy input is required and that it is silent, i.e. there is no external noise from collapsing gas bubbles as the carbon dioxide dissolves.

From the foregoing it will be apparent that a properly designed and managed fuel cell system is a viable proposition for a wide range of power generation requirements. The greater efficiency of the system, coupled with the lack of noisesome exhaust fumes makes it environmentally acceptable. The person skilled in the art will appreciate the wide range of applications of the basic system disclosed hereinbefore and the necessary variations required to meet each particular application, all falling within the scope of the invention.

The system described offers a viable clean efficient and self-contained means of electrical power generation which is applicable where mains electricity is not available.

We claim:

1. An electrical power generation system comprising:
  a supply of a hydrogen-containing fuel;
  a reformer for reforming said hydrogen-containing fuel to obtain hydrogen;
  a supply of oxygen;
  a fuel cell for producing electrical power, said fuel cell being fed with reactants including the hydrogen and the oxygen;
  a supply of material for producing an exothermic reaction;
  means for feeding the hydrogen and means for feeding the oxygen to the fuel cell for producing electrical power;
  means for disposing of waste products arising from the fuel cell and other parts of the electrical power generation system;
  a control means for regulating components of the electrical power generation system and for regulating flow streams of the system; and
  heat exchange means for substantially balancing the heating and cooling requirements within said system;
  wherein the reformer comprises:
    (i) a reforming chamber having an outer first wall, inlet means for feeding said hydrogen-containing fuel to the reforming chamber, and outlet means for removing hydrogen from the reforming chamber,
    (ii) a second chamber concentrically surrounding said reforming chamber and bounded on its inner side by said first wall and on its outer side by a second wall, said second chamber including inlet means for feeding said material for producing an exothermic reaction to the second chamber and outlet means for removing reaction products from the second chamber, and
    (iii) a preheating chamber concentrically surrounding the second chamber for preheating the hydrogen-containing fuel, said concentric preheating chamber being bounded on its inner side by said second wall and on its outer side by a third wall, and having an inlet means for feeding the hydrogen-containing fuel to the preheating chamber and an outlet means for removing preheated hydrogen-containing fuel from the preheating chamber and feeding the fuel to the reforming chamber;
  said first wall including a plurality of first fins passing through said first wall and extending into the second chamber and into the reforming chamber, respectively, said first fins being operative to conduct heat from the second chamber to the reforming chamber, said second wall including a plurality of second fins passing through said second wall so as to extend into the preheating chamber and into the second chamber respectively, said second fins being operative to conduct heat from the second chamber to the preheating chamber;
  and wherein the flow of material through the second chamber is co-current with respect to the flow of hydrogen-containing fuel through the reforming chamber and is counter-current with respect to the flow of hydrogen-containing fuel to be reformed passing through the preheating chamber.

2. An electrical power generation system according to claim 1 further comprising an apparatus for processing an oxygen containing substance to produce said supply of oxygen.

3. An electrical power generation system according to claim 1 wherein the material for producing an exothermic reaction comprises a combustible material.

4. An electrical power generation system according to claim 1 wherein the material for producing an exothermic reaction comprises hydrogen peroxide and the exothermic reaction comprises a decomposition reaction.

5. An electrical power generation system according to claim 1 wherein the portions of the first fins disposed in the combustion chamber are tapered.

6. An electrical power generation system according to claim 1 wherein the second fins are tapered.

7. An electrical power generation system according to claim 1 further comprising a reforming catalyst on the portions of the first fins disposed in or on the surface of the first wall in the reforming chamber.

8. An electrical power generation system according to claim 1 further comprising a catalyst for said exothermic reaction on the surfaces of the portions of the first and second fins disposed in or on the surfaces of the first and second walls in the second chamber.

9. An electrical power generation system according to claim 1 further comprising means for mixing said hydrogen containing fuel with water before feeding said fuel into the reforming chamber.

10. An electrical power generation system according to claim 9 further comprising means for pressurizing said fuel/water mixture.

11. An electrical power generation system according to claim 10 wherein said means for pressurizing the fuel/water mixture produces a pressure sufficient to impel the reactants or products thereof through said system without further impelling means.

12. An electrical power generation system according to claim 10 further comprising means for heating the pressurized fuel/water mixture to a temperature exceeding the temperature required in the reforming chamber and means for flash evaporating the fuel/water mixture.

13. An electrical power generation system according to claim 12 wherein the heating means includes the preheating chamber.

14. An electrical power generation system according to claim 1 further comprising a reforming catalyst in a pellet form positioned in the reforming chamber.

15. An electrical power generation system according to claim 1 further comprising means for purifying a hydrogen reactant produced by reforming the hydrogen-containing fuel.

16. An electrical power generation system according to claim 15 wherein the purification means includes means for removing hydrocarbons and metallic ions, means for catalytically oxidizing carbon monoxide to carbon dioxide, and membrane means for removing water vapor, carbon dioxide and higher hydrocarbons.

17. An electrical power generation system according to claim 3 further comprising means for including excess hydrogen reactant from the fuel cell in the combustible material.

18. An electrical power generation system according to claim 1 wherein the heat exchange means includes means for preheating the hydrogen-containing fuel for the reformer using heat from the reformer.

19. An electrical power generation system according to claim 1 wherein the heat exchange means includes means for preheating the hydrogen-containing fuel for the reformer using heat from the fuel cell.

20. An electrical power generation system according to claim 1 wherein said means for feeding the hydrogen and means for feeding the oxygen include reservoirs for the reactants.

21. An electrical power generation system according to claim 1 wherein the fuel cell is disposed inside a pressurized container.

22. An electrical power generation system according to claim 21 wherein a size of the pressurized container is in excess of that of a fuel cell and said pressurizable container serves as a reservoir for one of the reactants.

23. An electrical power generation system according to claim 22 wherein the fuel cell is disposed inside a plastic sleeve.

24. An electrical power generation system according to claim 23 wherein hydrogen and/or oxygen sensors are disposed inside the plastic sleeve.

25. An electrical power generation system according to claim 1 further comprising means for providing a high pressure in the reforming chamber.

26. An electrical power generation system according to claim 1 further comprising a turbine driven by waste gas from the system for producing electrical or mechanical power.

27. An electrical power generation system according to claim 1 further comprising a working fluid, means to evaporate the working fluid by heat exchange with waste gases from the system and a turbine driven by the evaporated working fluid.

28. An electrical power generation system according to claim 1 further comprising means for dissolving waste gases from the system in aqueous solution.

29. An electrical power generation system according to claim 1 further comprising means for extracting heat from waste gases from the system and for transporting said heat for use outside the electrical power generation system.

30. An electrical power generation system according to claim 1 further comprising a rechargeable battery disposed in parallel with the fuel cell and wherein the control means comprises a selection means to selectively cause the battery to augment the fuel cell when demand for power increases and to cause the fuel cell to charge the battery when demand decreases or is constant.

31. An electrical power generation system according to claim 1 including a rechargeable battery and wherein the control means includes a selection means for causing the battery to be connected in parallel with the fuel cell such that the battery and the control means are operative to:
(a) supply power to initiate the operation of the fuel cell,
(b) accept power from the fuel cell to recharge the battery and to maintain the battery at a given level of charge, and
(c) supply power from the battery in conjunction with the fuel cell to thereby produce a combined power output to comply with a given power requirement.

32. A method of electrical power generation comprising the steps of:
providing a hydrogen-containing fuel and a supply of oxygen;
providing a fuel cell for producing electrical power when fed with hydrogen and oxygen;
providing a reformer comprising a reforming chamber, a second chamber surrounding the reforming chamber and divided therefrom by a first common wall, and a preheating chamber surrounding said second chamber and divided therefrom by a second common wall;

providing first fins extending through said first common wall into said reforming chamber and said second chamber;

providing second fins extending through said second common wall into said preheating chamber and said second chamber;

supplying a material for producing an exothermic reaction to said second chamber and reacting said material in said second chamber to generate heat;

supplying said hydrogen-containing fuel to said preheating chamber and preheating said fuel by transferring heat to the preheating chamber through said second common wall and said second fins;

supplying said preheated hydrogen containing fuel to said reforming chamber, transferring heat from said second chamber to said reforming chamber, through said first common wall and said first fins, and reforming said hydrogen containing fuel in said reforming chamber to produce hydrogen, whereby said flow of exothermically reacting material through the second chamber is co-current with respect to the flow of fuel through the reforming chamber, such that the amount of heat transferred to the reforming chamber is greater towards entry regions of said chambers than towards exit regions thereof, and said flow of exothermically reacting materials is counter-current with respect to the flow of fuel to be reformed passing through the preheating chamber;

feeding said hydrogen and oxygen to said fuel cell to produce electrical power;

disposing of waste products from the fuel cell and other parts of the power generation system;

providing control means for monitoring the operating parameters of the power generation system as a whole and of individual components of the system and for regulating the same in accordance with the power demands on the system and regulating the flow of fuel, reactants and products between components of the system to substantially balance the heating requirements of one or more parts of the system with the cooling requirements of one or more other parts of the system.

33. A method of electrical power generation according to claim 32 further comprising the step of applying a catalyst for the exothermic reaction to the surface of the portions of the first fins, and to the surface of the first common wall, in the second chamber.

34. A method of electrical power generation according to claim 32 wherein the exothermic reaction is a combustion reaction.

35. A method of electrical power generation according to claim 32 wherein the exothermic reaction comprises the decomposition of hydrogen peroxide.

36. A method of electrical power generation according to claim 32 further comprising the steps of providing a rechargeable battery and connecting said battery in parallel with the fuel cell, said control means including a selection means operable to:

(a) supply power from the fuel cell to the battery to recharge the battery when demand for power decreases or is constant and (b) draw power from the battery to augment the fuel cell output when demand for power increases.

37. A method of electrical power generation according to claim 36 wherein, when supplying power from the fuel cell to recharge the battery, the control means conditions the output of the fuel cell such that the voltage supplied from the fuel cell to the battery is slightly greater than the voltage of the battery.

38. A method of electrical power generation according to claim 37 wherein the control means regulates the output of the fuel cell by accurate control of the rate of input of one or both of the hydrogen and oxygen to the fuel cell.

* * * * *